(12) United States Patent
de Lore et al.

(10) Patent No.: US 9,873,566 B2
(45) Date of Patent: Jan. 23, 2018

(54) DRIVE ISOLATION SYSTEMS AND METHODS FOR CONVEYORS

(71) Applicant: Joy MM Delaware, Inc., Wilmington, DE (US)

(72) Inventors: Andrew de Lore, Yattalunga (AU); Peter Fitzpatrick, Somersby (AU)

(73) Assignee: Joy MM Delaware, Inc., Wilmington, DE (US)

( * ) Notice: Subject to any disclaimer, the term of this patent is extended or adjusted under 35 U.S.C. 154(b) by 41 days.

(21) Appl. No.: 14/631,489

(22) Filed: Feb. 25, 2015

(65) Prior Publication Data

US 2015/0239673 A1 Aug. 27, 2015

Related U.S. Application Data

(60) Provisional application No. 61/944,494, filed on Feb. 25, 2014.

(51) Int. Cl.
*B65G 43/00* (2006.01)
*B65G 23/36* (2006.01)
*B65G 43/08* (2006.01)

(52) U.S. Cl.
CPC ............ *B65G 23/36* (2013.01); *B65G 43/00* (2013.01)

(58) Field of Classification Search
None
See application file for complete search history.

(56) References Cited

U.S. PATENT DOCUMENTS

| 4,217,622 A | 8/1980 | Dinkelbach et al. | |
| 4,574,943 A | 3/1986 | Green | |
| 5,087,864 A | 2/1992 | Abel | |
| 5,145,054 A * | 9/1992 | Nelson | B06B 1/0261 198/524 |
| 5,318,167 A * | 6/1994 | Bronson | B65G 47/261 198/343.1 |
| 5,883,816 A * | 3/1999 | Dollhopf | G05B 19/0421 361/1 |

(Continued)

FOREIGN PATENT DOCUMENTS

WO 2012142674 A2 10/2012

OTHER PUBLICATIONS

International Search Report and Written Opinion for PCT Application No. PCT/US2015/017544 dated Jun. 5, 2015 (13 pages).

*Primary Examiner* — Kavel Singh
(74) *Attorney, Agent, or Firm* — Michael Best & Friedrich LLP

(57) ABSTRACT

Systems, methods, and computer-readable medium containing instructions for operating a conveyor. One method includes receiving, by a controller, a signal from each of a plurality of substations. Each of the plurality of substations provides power to a motor drive unit driving a conveyor belt of the conveyor. The signal received by the controller indicates whether an isolation switch associated with each substation has been manually operated. The method also includes, when the signal received from one of the plurality of substations indicates that the isolation switch associated with the one of the plurality of substations has been manually operated, transmitting, by the controller, a signal to each of the plurality of substations, the signal instructing each of the plurality of substations to isolate the motor drive unit from a power source.

18 Claims, 4 Drawing Sheets

(56) References Cited

U.S. PATENT DOCUMENTS

| | | | |
|---|---|---|---|
| 6,705,454 B2 * | 3/2004 | Fishaw | B65G 43/08 198/571 |
| 2010/0217409 A1 | 8/2010 | Ebner | |

* cited by examiner

DRIVE ISOLATION SYSTEMS AND METHODS FOR CONVEYORS

RELATED APPLICATIONS

This application claims priority to U.S. Provisional Patent Application No. 61/944,494 filed Feb. 25, 2014, the entire content of which is incorporated by reference herein.

FIELD

Embodiments of the invention relate to conveyor systems that include multiple power input systems. In particular, embodiments of the invention relate to isolating electrical power from multiple power input system of a conveyor system.

SUMMARY

As the mining industry has evolved, conveyors have gotten larger and longer. In longer conveyors, the conveyor often includes multiple power input systems that provide power to the conveyor along the length of a conveyor. Each power input system includes a substation that provides power transformation and switching and one or more motor drive units. The motor drive units provide power conversion (e.g., electric power to mechanical power) for driving a conveyor belt of the conveyor.

Each substation is associated with an isolation mechanism (e.g., a switch) operable to isolate electrical energy from the motor drive units associated with the substation. Accordingly, to isolate all motor drive units, an operator traditionally had to travel to the physical location of each substation, commonly kilometers apart, and manually operate the associated isolation mechanism. Accordingly, this type of isolation process requires extensive time to implement. This time requirement often tempts maintenance personnel to take short cuts to perform repairs and maintenance without providing full electrical isolation.

Accordingly, to alleviate these and other issues, embodiments of the invention provide a mechanical drive isolation system for a conveyor. The mechanical drive isolation system isolates electrical energy sources (i.e., substations) from the conveyor through the activation of a single isolation mechanism at the physical location of one substation. Also, in some embodiments, an operator can operate the isolation mechanism at any location along the conveyor to provide the electrical isolation.

For example, one embodiment of the invention provides a system for operating a conveyor. The system includes a plurality of motor drive units positioned along a length of the conveyor. Each of the plurality of motor drive unit drives a sprocket that drives a conveyor belt of the conveyor. The system also includes a plurality of substations. Each of the plurality of substations provides power from a power source to one or more of the plurality of motor drive unit. Each of the plurality of substations includes a circuit breaker and a detection device. The detection device is configured to detect when the circuit breaker is open. The system further includes a switch associated with each of the plurality of substations. The switch is manually operable to open and close. In addition, the system includes a controller configured to communicate with each of the plurality of substations. The controller is configured to receive a signal from the switch associated with each of the plurality of substations, identify, based on the signal, when the switch for one of the plurality of substations is open, and, when the switch is open for one of the plurality of substations, transmit a signal to each of the plurality of substations instructing the circuit breaker to open in each of the plurality of substations.

Another embodiment of the invention provides a method of operating a conveyor. The method includes receiving, by a controller, a signal from each of a plurality of substations providing power to a motor drive unit driving a conveyor belt of the conveyor. The signal received at the controller indicating whether an isolation switch associated with each substation has been manually operated. The method also includes, when the signal received from one of the plurality of substations indicates that the isolation switch associated with the one of the plurality of substations has been manually operated, transmitting, by the controller, a signal to each of the plurality of substations, the transmitted signal instructing each of the plurality of substations to isolate the motor drive unit from a power source.

Yet another embodiment of the invention provides non-transitory computer-readable medium storing instructions executable by a processing unit to operate a conveyor. The instructions including instructions for receiving a signal from each of a plurality of substations providing power to a motor drive unit driving a conveyor belt of the conveyor, the signal indicating whether an isolation switch associated with each substation has been manually operated. The instructions also including instructions for transmitting a signal to each of the plurality of substations, the signal instructing each of the plurality of substations to isolate the motor drive unit from a power source when the signal received from one of the plurality of substations indicates that the isolation switch associated with the one of the plurality of substations has been manually operated.

Other aspects of the invention will become apparent by consideration of the detailed description and accompanying drawings.

DETAILED DESCRIPTION

Figure 1:
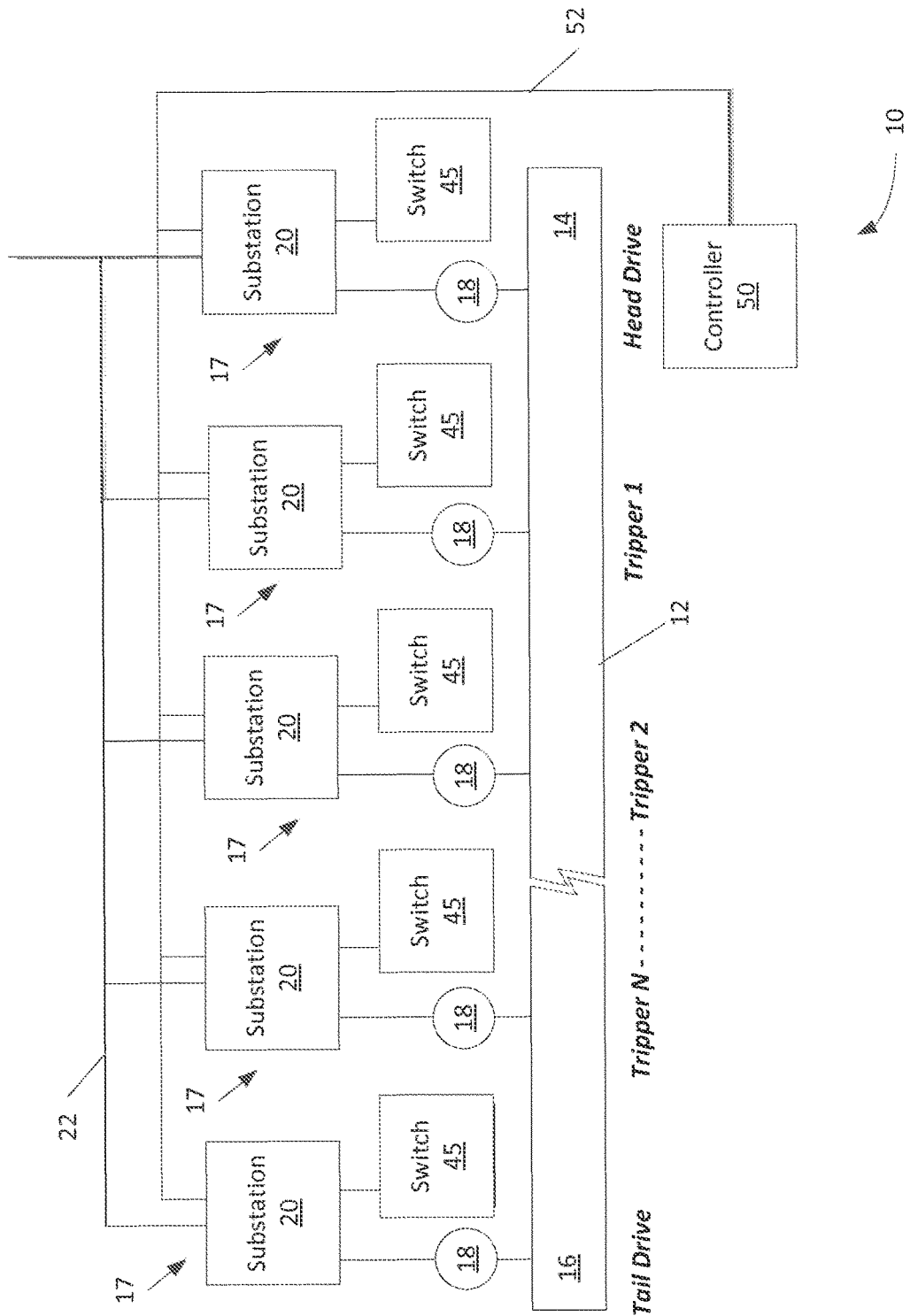
FIG. 1 schematically illustrates a conveyor system.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Furthermore, and as described in subsequent paragraphs, the specific configurations illustrated in the drawings are intended to exemplify embodiments of the invention. It should be understood that other alternative configurations are possible.

Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc. In addition, it should be noted that a plurality of hardware and software based devices, as well as a plurality of different structural components may be utilized to implement the invention. For example, "controllers" and "control devices" disclosed in the present application include one or more processing units (e.g., microprocessors, application specific integrated circuits ("ASICs"), etc.), one or more non-transitory computer-readable memory modules storing instructions, and one or more input/output interfaces for communicating with other devices (e.g., over a wired connection, a wireless connection, or a combination thereof). Furthermore, the terms "circuit breaker" and "contactor" as used in the present application broadly refer to devices with at least two conditions (e.g., open and close) and these terms may be used interchangeably herein.

FIG. 1 illustrates a conveyor system 10. The conveyor system 10 can be used in underground mining (e.g., coal) operations. The system 10 includes a conveyor 12 that has a head or discharge end 14 and a tail or receiving end 16. In use, material flows from the tail end 16 to the head end 14. The conveyor 12 includes a plurality of sprockets that, when rotated, drive a conveyor belt. Along the length of the conveyor 12 are multiple power input systems 17. The multiple power input systems 17 are positioned along the length of the conveyor 12. Each power input system 17 includes one or more motor drive units 18 and a substation 20. Each motor drive unit 18 includes a motor and a gear box that converts electrical power into mechanical power for driving a sprocket included in the conveyor 12.

As illustrated in FIG. 1, in some embodiments, each power input system 17 includes one or more motor drive units 18 that can be named based on the location of the drive units 18. For example, one power input system 17 can include motor drive units 18 located at the head end 14, which can be referred to as "head drives." Similarly, one power input system 17 can include motor drive units 18 located at the tail end 16, which can be referred to as "tail drives." Also, one or more power input systems 17 can include motor drive units 18 not located at the head end 14 or the tail end 16, which can be referred to as "tripper drives." Accordingly, each grouping of drive units 18 can be associated with a single, dedicated substation 20. Configuring motor drive units 18 into groups of drive units offers advantages in equipment selection and operation. However, it should be understood that different names and groupings can be applied to the motor drive units 18.

Figure 2:
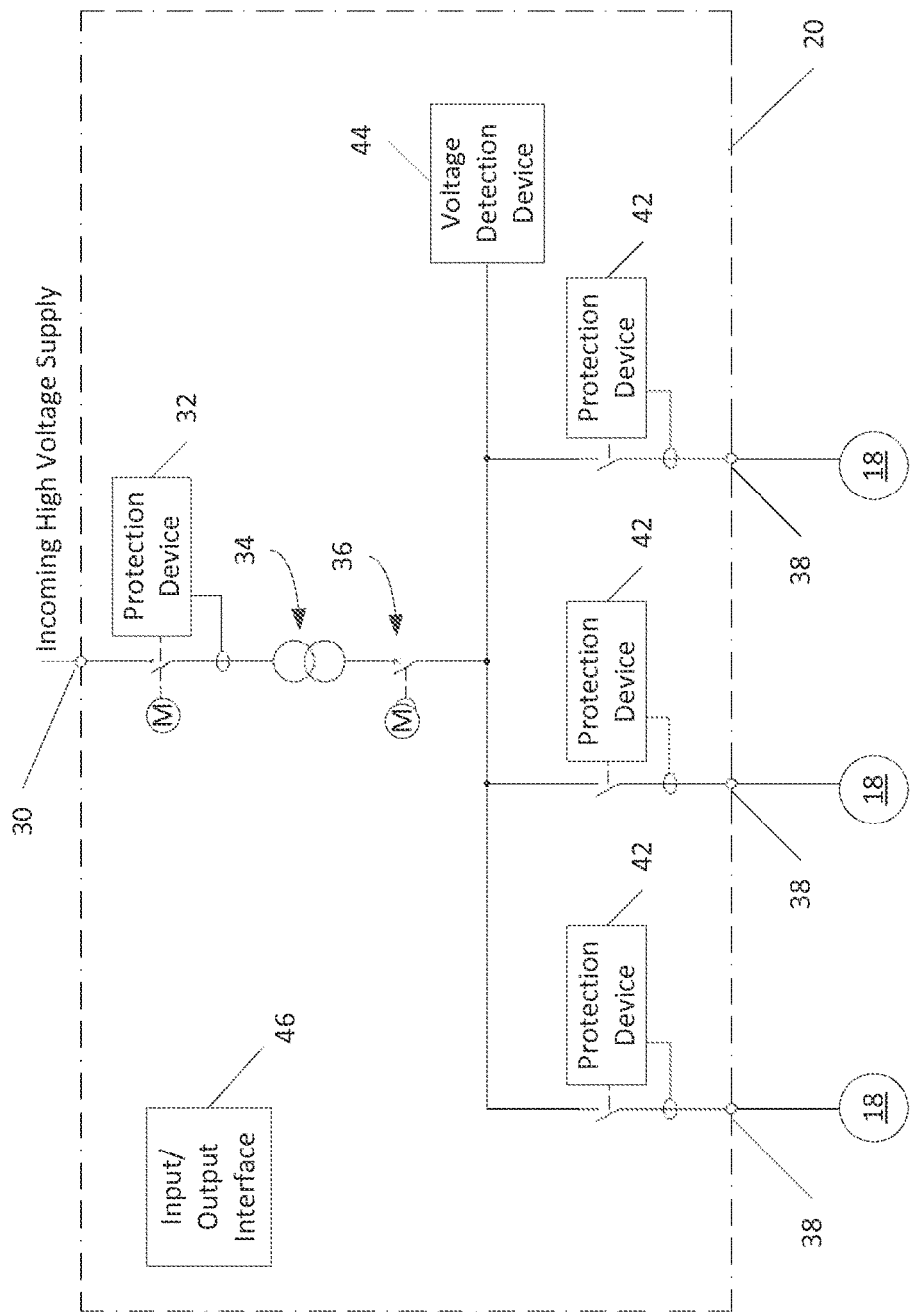
FIG. 2 schematically illustrates a substation included in the conveyor system of FIG. 1.

Each substation 20 receives electrical power from a power source (e.g., a high voltage power source) through a power distribution channel or bus 22 and distributes electrical power to individual motor drive units 18. In some embodiments, each substation 20 transforms power received over the bus 22 to power usable by a motor drive unit 18. As illustrated in FIG. 2, each substation 20 includes a power supply input 30 (e.g., receiving an incoming high voltage power supply). Each substation 20 also includes a protection device 32, a power transformer 34, and an isolation circuit breaker 36. The protection device 32 regulates power supplied to the substation 20 to provide overcurrent protection for the power transformer 34, which transforms the received high voltage power to power usable by the motor drive units 18.

The isolation circuit breaker 36 is connected to one or more power supply outputs 38, each of which is connected to a motor drive unit 18. In some embodiments, the isolation circuit breaker 36 is controlled by the controller 50 (described below) to isolate power provided through the power transformer 34 from the outputs 38 and, therefore, isolate the mechanical drive provided through the motor drive units 18 from the power supply. As illustrated in FIG. 2, each substation 20 also includes a protection device 42 for each output 38. In some embodiments, each protection device 42 includes a protection relay and a contactor, which are used as a switch to isolate a particular output 38 from the power transformer 34. The substation 20 also includes a voltage detection device 44. The voltage detection device 44 monitors the voltage of the substation 20 to identify whether the circuit breaker 36 is open or closed and whether, when the circuit breaker is open, there is no leakage voltage present within the substation 20. In some embodiments, the status of the protection devices 42 (e.g., whether each device 42 is open or closed) is monitored by the controller 50 through the input/output interface 46.

As illustrated in FIG. 1, each substation 20 is also associated with a switch 45. An operator manually operates the switch 45 to request isolation of the motor drive units 18 at each substation 20. For example, the switch 45 can have two conditions: an open condition and a closed condition. As described below in more detail, in the open condition, the switch 45 transmits a signal indicating the operator's request for isolation, and, in the closed condition, the switch 45 transmits a signal requesting re-connection of the motor drive units 18. In some embodiments, each switch 45 can include a lock (e.g., a padlock) to prevent the switch 45 from unintentionally changing state (e.g., changing state accidentally or changing state intentionally by an unauthorized individual). For example, in some embodiments, the switch 45 can be locked in an "off" state (i.e., an isolation state or not-permitted-to-run state).

Each substation 20 also includes an input/output interface 46 for communicating (e.g., over a wired communication channel or a wireless communication) with one or more external devices. For example, as illustrated in FIG. 1, each substation 20 communicates with a belt starter controller 50. In some embodiments, the substations 20 communicate with the belt starter controller 50 over a wired communication channel 52, which can include a fibre optic communication channel. In some embodiments, the belt starter controller 50 includes switches, buttons, and other input mechanisms that allow an operator to configure and control the conveyor system 10. In some embodiments, the input mechanisms of the belt starter controller 50 can be locked to prevent unauthorized use. The controller 50 can also include an output (e.g., a display) that provides information to an operator and aids the operator in configuring and controlling the system 10. As illustrated in FIG. 1, the belt starter controller 50 can be located at the discharge end 16 of the conveyor 12. However, it should be understood that the belt starter controller 50 can be located at any location around the conveyor 12, and, in some embodiments, the belt starter controller 50 is located remote from the conveyor 12 (e.g., and communicate with the substations 20 over a wireless communication channel).

Figure 3:
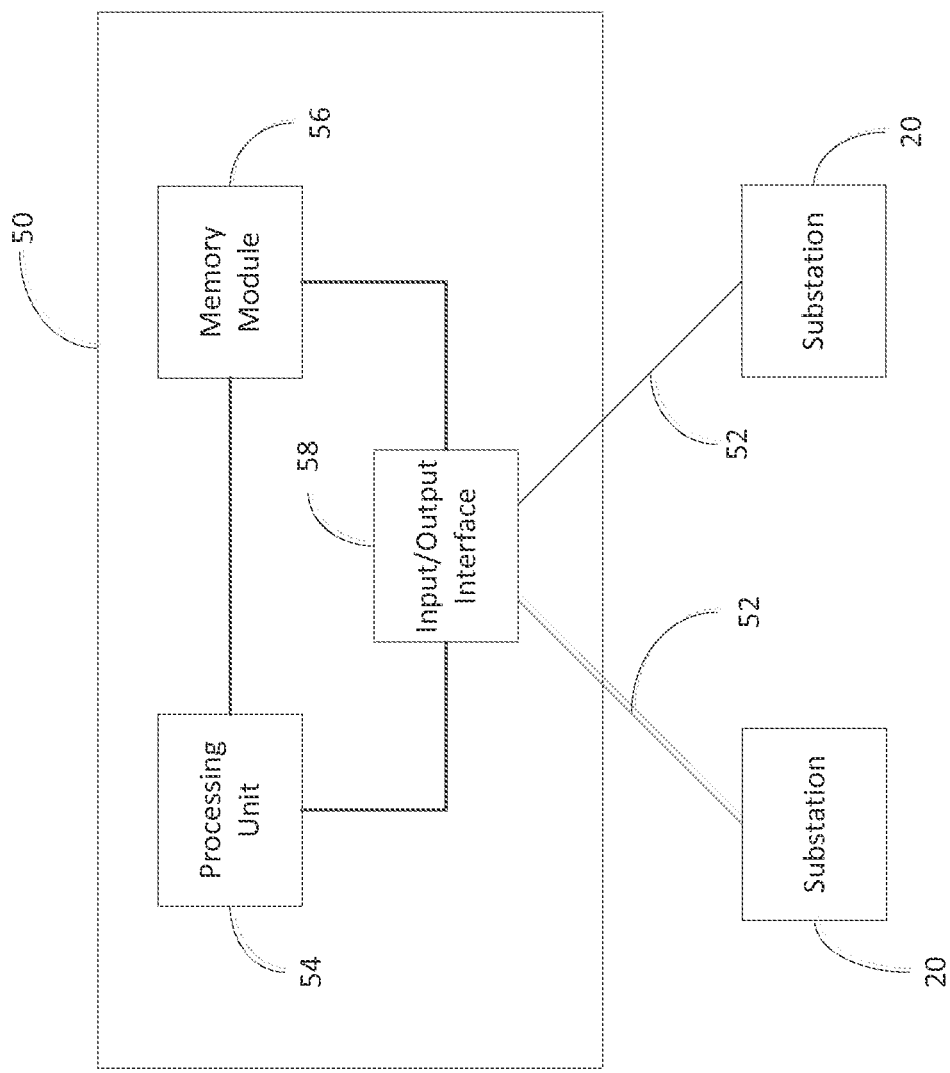
FIG. 3 schematically illustrates a belt starter controller included in the conveyor system of FIG. 1.

As illustrated in FIG. 3, the controller 50 includes one or more processing units 54, such as a microprocessor or an application-specific integrated circuit ("ASIC"), one or more memory modules 56, and one or more input/output interfaces 58. The memory module 56 includes non-transitory computer-readable medium, such as random-access memory ("RAM"), read-only memory ("ROM"), or a combination thereof. The processing unit 54 can retrieve instructions from the memory module 56 and execute the instructions to perform particular functionality. The processing unit 54 can also retrieve and store data to the memory module 56 as part of executing the instructions.

In addition, the processing unit 54 can communicate with devices and systems external to the belt starter controller 50 through the input/output interface 58. For example, as noted above, the substations 20 can communicate with the belt starter controller 50. It should be understood that the controller 50 can also communicate with the switches 45 associated with the substations 20. In some embodiments, the controller 50 communicates with the switches 45 through the associated substations 20 (e.g., through the input/output interface 46 of the substations 20, which can be configured to communicate with the switches 45). In other embodiments, the controller 50 communicates with the switches 45 using a separate communication channel (e.g., wired or wireless). It should be understood that the belt starter controller 50 can include additional components than those described herein. Furthermore, in some embodiments, the functionality performed by the belt starter controller 50 can be distributed among multiple systems or devices.

The belt starter controller 50 is configured to communicate with, control, and monitor the substations 20. For example, instructions executed by the processing unit 54 can control normal operation of the conveyor 12. In some embodiments, the processing unit 54 can also execute instructions for isolating motor drive units 18 as described below. For example, an operator can use the belt starter controller 50 to configure the substations 20. In particular, in some embodiments, each substation 20 is assigned a unique identifier. An operator can use the belt starter controller 50 to specify the unique identifiers for the substations 20 included in the system 10. In some embodiments, each substation 20 used in the system 10 is identical except for the assigned identifier. Accordingly, when a substation 20 is malfunctioning it can be quickly and easily replaced with a new substation 20 without requiring any type of customization. In particular, to enable or disable substations 20 for the system 10, an operator can use the belt starter controller 50 to provide the unique identifiers for those substations 20 included in the system 10. For example, an operator can allocate a unique identifier of a substation 20 to each physical location or grouping along the conveyor 12. Unused power locations can be assigned a null identifier. This interchangeability of substations 20 also allows the length of the conveyor 12 to be easily changed, which impacts the number of power input systems 17 needed.

As noted above, to isolate motor drive units from a power source (e.g., for safety considerations during maintenance or other repair work), an operator traditionally had to travel to each power input system and manually activate the associated isolation mechanism. Accordingly, it isn't until all mechanisms were manually set to an open condition that electrical energy was properly isolated from the conveyor system 10. Similarly, in some embodiments, motor drive units for the conveyor could only be activated when each isolation mechanism for each substation was manually set to a closed condition.

Figure 4:
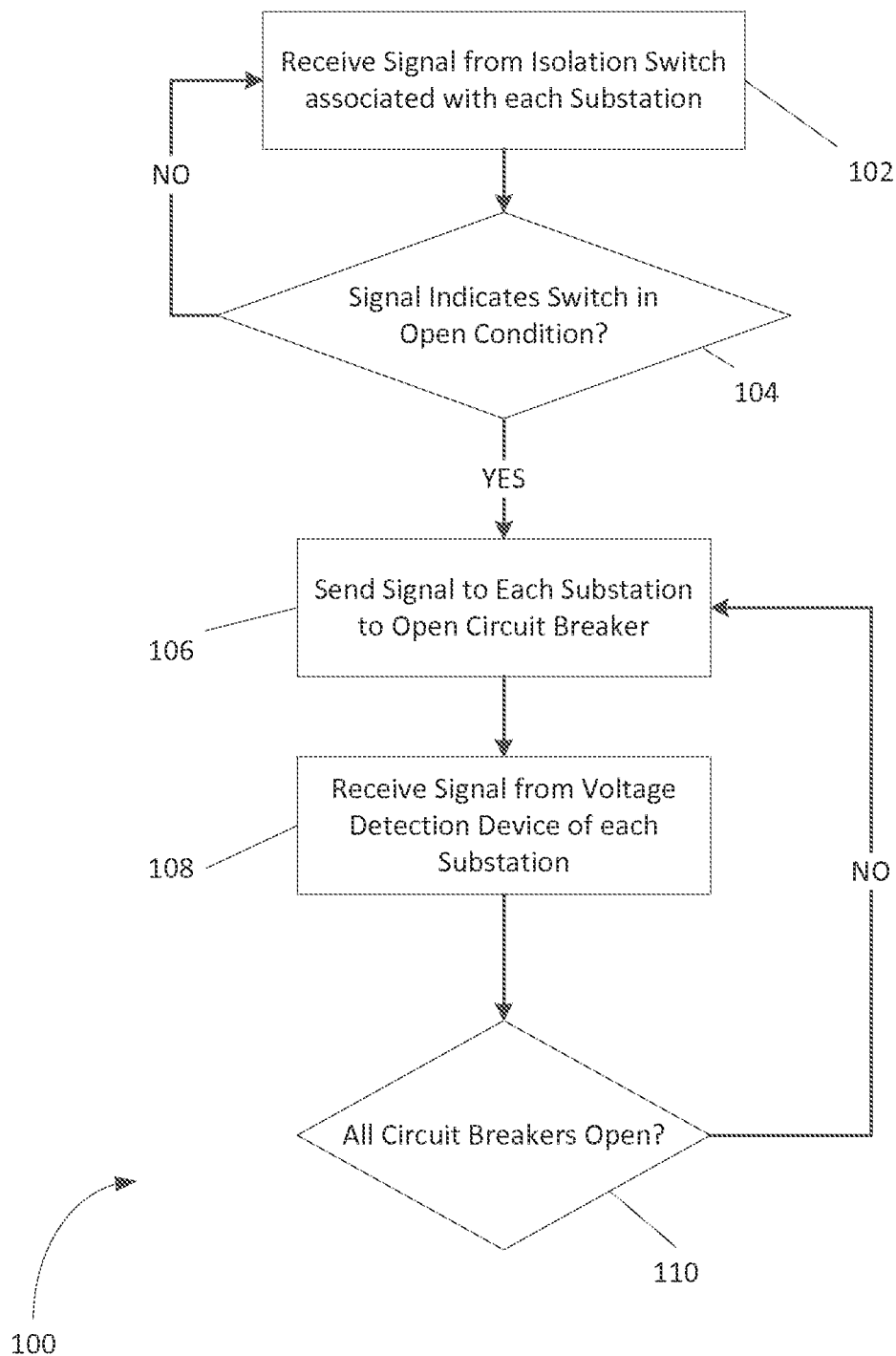
FIG. 4 is a flow chart illustrating a method of isolation motor drive units of a conveyor system performed by the conveyor system of FIG. 1.

However, in the system 10 illustrated in FIG. 1, all of the motor drive units 18 can be isolated from the power source by activating a single switch 45 at the location of one power input system 17. For example, FIG. 4 illustrates a method 100 performed by the system 10 to isolate the motor drive units 18 from the power source. To perform the isolation method 100, the belt starter controller 50 detects when any one of the switches 45 is manually activated. For example, in one embodiment, the controller 50 receives signals from the switch 45 associated with each substation 20 (at block 102). The received signal indicates whether the switch 45 is in an open condition or a closed condition. In some embodiments, one or more position sensors (e.g., switches or other devices configured to detect a position of the switch 45) (e.g., included in the switch 45 and/or the substation 20) monitor the position of the switch 45. Accordingly, input from these sensors can be used to determine the type of signal to transmit to the controller 50. This logic can be performed by the substation 20 or by the switch 45. In some embodiments, multiple sensors are used for redundancy purposes.

If the controller 50 receives a signal from a switch 45 that indicates that the switch 45 is in an open condition, the controller 50 transmits a signal to each substation 20 included in the system 10 instructing the substation 20 to isolate the motor drive units 18 from the power source (at block 106). In particular, the controller 50 transmits a signal to each substation 20 through the input/output interface 46 of each substation 20. The signal instructs the circuit breaker 36 and, optionally, other switch-type devices included in the substation 20, such as the protection devices 32 and 42, to open. These devices can be opened using motorized devices, such as servo motors and electromagnetic controls.

Accordingly, rather than having to operate the switch 45 at each substation 20, an operator can manually operate a single switch 45 at one substation 20 to signal to the controller 50 that isolation of all of the motor drive units 18 of the system 10 is requested. The controller 50 can then transmit signals to all of the substations 20 to cause the isolation. Therefore, isolation of the conveyor system 10 can be quickly and efficiently performed from the location of one substation 20.

In some embodiments, after transmitting the signals to the substations 20, the controller 50 is configured to continue to monitor signals from the voltage detection device 44 of each substation 20 to ensure that the circuit breaker 36 and other switch-type devices have successfully opened (at block 108). If any signal received by the controller 50 indicates a substation 20 has not successfully isolated its associated motor drive units 18 (or leakage voltage is present within the substation 20) (at block 110), the controller 50 can re-transmit the signal to the malfunctioning substation 20 or all substations 20 (at block 106). This monitoring functionality can provide the controller 50 with a safety integrity level ("SIL") of 3.

In some embodiments, after isolating the motor drive units 18, an operator can reconnect all of the motor drive units 18 to the power source. For example, an operator can manually operate the switch 45, previously placed in the open condition, to place the switch 45 in the closed condition. The controller 50 can receive a signal from the switch 45 indicating the closed position and can transmit a signal to each substation 20 instructing the substation 20 to reconnect the motor drive units 18 to the power source. In particular, the controller 50 can transmits a signal to each substation 20 through the input/output interface 46 of each substation 20, which instructs the circuit breaker 36 and, optionally, other switch-type devices included in the substation 20, such as the protection devices 32 and 42, to close. After transmitting the signal, the controller 50 can also monitor the state of the circuit breaker 36 and other switch-type devices included in the substation 20 as described above to ensure that all of the circuit breakers 36 are closed. In some embodiments, the controller 50 can ensure that all of the switches 45 and all of the circuit breaker 36 (and, optionally, other previously-opened switch-type devices) are in a closed or run condition before allowing operation of the conveyor 12.

It should also be understood that in some embodiments, an operator can isolate the motor drive units 18 through the belt starter controller 50 regardless of whether a switch 45 was manually operated. For example, an individual can initiation isolation at the belt starter controller 50, which causes the belt starter controller 50 to transmit the signals to the substations 20 requesting isolation.

Thus, embodiments of the invention provide, among other things, isolation systems and methods for use with conveyors. The system allows an operator to isolate mechanical drive units of the conveyor from electrical power from one physical location along the length of the conveyor. The system also allows an operator to easily change to the number of substations that are currently in use on the conveyor and interchange substations 20 (e.g., without requiring customizations to the substation) at any location along the conveyor 12.

Various features and advantages of the invention are set forth in the following claims.

What is claimed is:

1. A system for operating a conveyor, the system comprising:
   a plurality of motor drive units positioned along a length of the conveyor, each of the plurality of motor drive unit driving a sprocket that drives a conveyor belt of the conveyor;
   a plurality of substations, each of the plurality of substations configured to provide power from a power source to one or more of the plurality of motor drive units and each of the plurality of substations including a circuit breaker;
   a switch associated with each of the plurality of substations, the switch manually operable to an open condition and a closed condition; and
   a controller configured to communicate with each of the plurality of substations, the controller configured to
      receive a signal from the switch associated with each of the plurality of substations,
      identify, based on the signals, when the switch associated with one of the plurality of substations is in the open condition, and
      when the switch associated with one of the plurality of substations is in the open condition, transmit a signal to each of the plurality of substations instructing the circuit breaker to open in each of the plurality of substations.

2. The system of claim 1, wherein the controller is configured to communicate with each of the plurality of substations over a fibre optic communication channel.

3. The system of claim 1, wherein each of the plurality of substations further includes a protection device for regulating power supplied to the one or more motor drive units.

4. The system of claim 3, wherein the protection device includes a contactor.

5. The system of claim 3, wherein each of the plurality of substations further includes a detection device configured to detect when the protection device is open.

6. The system of claim 1, wherein each of the plurality of substations further includes a detection device configured to detect when the circuit breaker is open.

7. The system of claim 6, wherein the detection device includes a voltage detection device.

8. The system of claim 6, wherein the controller is further configured to,
   after transmitting the signal to each of the plurality of substations, monitor signals received from the detection device of each of the plurality of substations,
   determine, based on the signals received from the detection device of each of the plurality of substations, when the circuit breaker of at least one of the plurality of substations is not open, and
   retransmit the signal to the at least one of the plurality of substations.

9. The system of claim 1, wherein the controller includes a belt starter controller.

10. The system of claim 1, wherein the controller is further configured to receive a configuration for each of the plurality of substations, the configuration including a unique identifier of each of the plurality of substations and a location of each of the plurality of substations along the conveyor.

11. A method of operating a conveyor, the method comprising:
    receiving, by a controller, a signal from each of a plurality of substations providing power to a motor drive unit driving a conveyor belt of the conveyor, the signal indicating whether an isolation switch associated with each substation has been manually operated; and
    when the signal received from one of the plurality of substations indicates that the isolation switch associated with the one of the plurality of substations has been manually operated, transmitting, by the controller, a signal to each of the plurality of substations, the transmitted signal instructing each of the plurality of substations to isolate the motor drive unit from a power source.

12. The method of claim 11, wherein receiving the signal from each of the plurality of substations including receiving a signal from the isolation switch associated with each sub station.

13. The method of claim 11, wherein transmitting the signal to each of the plurality of substations includes transmitting a signal to a motorized switch device included in each of the plurality of substations, the signal instructing the motorized switch device to open.

14. The method of claim 11, further comprising receiving, after transmitting the signal to each of the plurality of substations, a signal from each of the plurality of substations, the signals indicating whether each substation has successfully isolated the motor drive unit from the power source and retransmitting the signal when, based on the signal received after transmitting the signal, one of the plurality of substations has not successfully isolated the motor drive unit from the power source.

15. Non-transitory computer-readable medium storing instructions executable by a processing unit to operate a conveyor, the medium comprising instructions for:
    receiving a signal from each of a plurality of substations providing power to a motor drive unit driving a conveyor belt of the conveyor, the signal indicating whether an isolation switch associated with each substation has been manually operated; and
    when the signal received from one of the plurality of substations indicates that the isolation switch associated with the one of the plurality of substations has been manually operated, transmitting a signal to each of the plurality of substations, the signal instructing each of the plurality of substations to isolate the motor drive unit from a power source.

16. The system of claim 1, wherein the controller is configured to transmit the signal to each of the plurality of substations instructing the circuit breaker to open in each of the plurality of substations by transmitting a first signal to a previous substation positioned before the one of the plurality of substations associated with the switch in the open condition and transmitting a second signal to a subsequent substation positioned after the one of the plurality of substations associated with the switch in the open condition.

17. The system of claim 1, wherein the controller is further configured to
receive a second signal from the switch associated with each of the plurality of substations,
identify, based on the second signals, when the switch associated with a second one of the plurality of substations is in the closed condition, and
when the switch associated with the second one of the plurality of substations is in the closed condition, transmit a reconnect signal to each of the plurality of substations instructing the circuit breaker to close in each of the plurality of substations,
wherein the controller is configured to transmit the reconnect signal to each of the plurality of substations by transmitting a first reconnect signal to a previous substation positioned before the second one of the plurality of substations associated with the switch in the closed condition and transmitting a second reconnect signal to a subsequent substation positioned after the second one of the plurality of substations associated with the switch in the closed condition.

18. The system of claim 17, wherein the controller is further configured to,
after transmitting the reconnect signal to each of the plurality of substations, monitor signals received from a detection device included in each of the plurality of substations, wherein the detection device included in each of the plurality of substations and is configured to detect when the circuit breaker is closed,
determine, based on the signals received from the detection device of each of the plurality of substations, when the circuit breaker of at least one of the plurality of substations is not closed, and
retransmit the signal to the at least one of the plurality of substations.

* * * * *